Patented July 13, 1926.

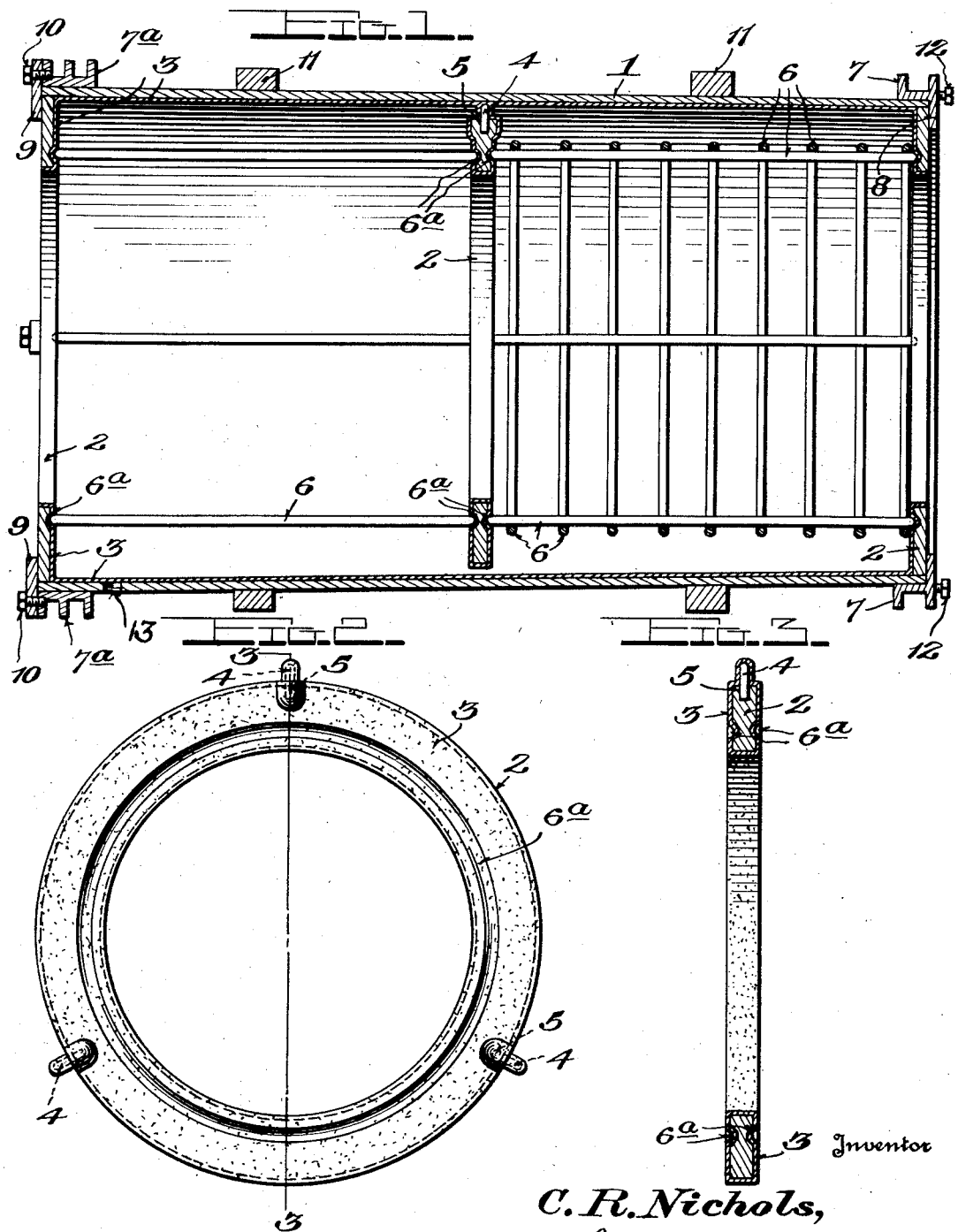

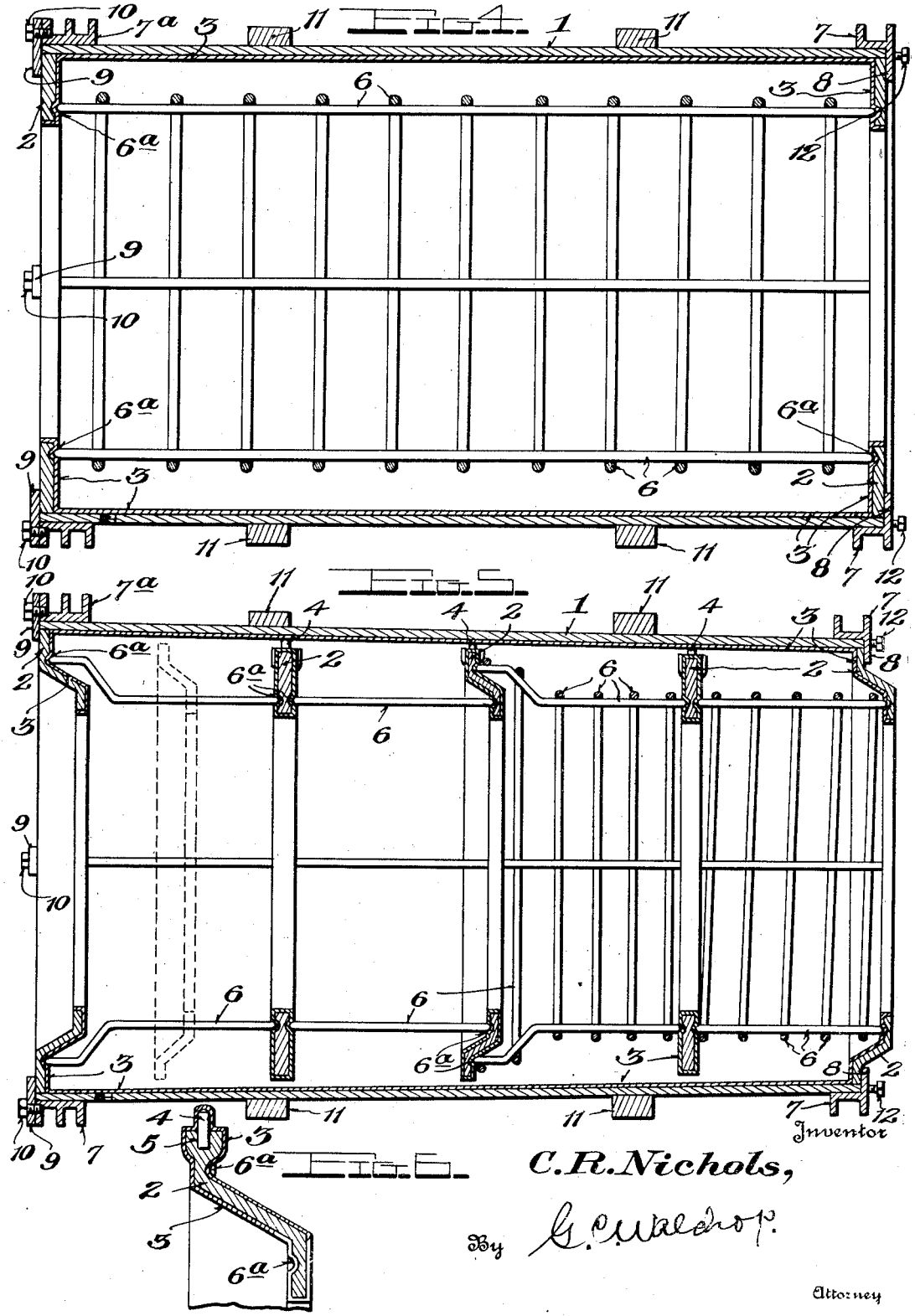

1,592,673

UNITED STATES PATENT OFFICE.

CLIFFORD RALPH NICHOLS, OF DETROIT, MICHIGAN.

METHOD OF AND APPARATUS FOR CASTING CEMENTITIOUS BODIES IN SECTIONS.

Application filed March 22, 1926, Serial No. 96,610, and in France December 7, 1925.

This invention relates to forming and curing bodies of plastic material and has particular reference to a process of and apparatus for the forming of such bodies in cylindrical sections within rotating moulds.

The invention has particular application to moulds of one-piece construction, such as shown in my prior Patent No. 1,457,185 wherein the cast product is removed longitudinally from the mould.

The invention contemplates the provision of novel means whereby the reinforcements for the product are spaced away from the mould walls by being supported by the means used to shape or form the ends of the section being cast.

The invention further contemplates such reinforcements which in turn, space the body and forming members longitudinally of the mold to thus form a body into a plurality of sections of desired lengths.

A further object of the invention is to employ a fusible material to coat the entire molding surfaces of the mould and end forming members whereby to provide for the free circulation of the curing media and ready removal of the ware from the mould when cured.

Still further the invention contemplates the support of the cast body away from the wall of the mould when the mould lining of fusible material has been melted, which support is effected by the reinforcements for the body in cooperation with the end forming or shaping members.

The invention also aims to provide novel means for positioning the body end forming or dividing members within the mould which will not scar or injure the mold.

Still another object of the invention is to provide for the longitudinal introduction into the mould of the reinforcements and section end forming members, and for the corresponding longitudinal withdrawal of the completed product from the mould without dismantling the latter and without injury thereto.

The following description together with the accompanying drawings is such clear disclosure as will enable those skilled in the art to understand and practice the invention.

Like characters refer to like elements throughout the term "end forming members" referring to the elements designed to form or shape the ends of the cast sections.

Fig. 1 is a longitudinal sectional view of a mould having end forming members and reinforcements arranged therein for moulding sections with flat ends;

Fig. 2 is a front elevation of one of the end forming members employed in moulding flat or straight end sections;

Fig. 3 is a section on line 3—3 of Fig. 2;

Fig. 4 is a longitudinal section of a mould with end forming members and reinforcements arranged therein for forming a single section, whereby the latter is supported away from the mould wall when the lining for the latter has been fused or melted;

Fig. 5 is a longitudinal sectional view of a mold having end forming members and reinforcements arranged therein for forming a multiple number of sections in a single molding operation, some of which sections have tongue and groove ends and some straight or flat ends, and Fig. 6 is a fragmentary enlarged sectional view of a tongue and groove end forming member illustrating the spacing means mounted thereon, for positioning the end forming members circumferentially within the mould.

In Fig. 1, 1 is a mould, 2 is the end forming member, which may be positioned at any point longitudinally of the mould, and 3, is a fusible material with which the molding surfaces of the mould and the end forming members are coated. 4 are pins of any suitable material, such as lead or wood, inserted into hole 5 in the end forming member 2, whereby the latter is positioned circumferentially within the mold as will be later described in detail. 6 is a reinforcing for the body to be cast and may be of any desired design, that shown in the left hand end of Figure 6 is formed of straight longitudinal sections, while that illustrated to the right has circumferential reinforcements for the body wound about and secured to the longitudinals. The design of such reinforcements is no part of my invention which latter contemplates the use of any desired type. 6ª is an annular groove in end forming members 2 adapted to receive the ends of the reinforcing. 7 is a band encircling the mould to strengthen the latter, the band having an annular flange 8 which extends over the edge of the mould and forms an anchor for end forming member 2 to rest against when the latter is in position for the mould to be charged. 7ª is a similar band encircling the opposite end of the mould but has no projecting flange over the edge of the mould, thus leaving a free opening through which the end forming members and reinforcements may be introduced into the mould and the cast bodies withdrawn. 9 is an annular ring secured to band 7ª by studs 10 to secure the end forming member in the unobstructed end of the mould. 11—11 are runner rims or bands by which the mould is further strengthened, supported and rotated. 12 are studs securing a bulkhead to the end of the mould where curing under pressure is practiced as will be later described, the studs 10 serving for the same purpose on the opposite end of the mould. 13 is threaded opening for draining away the fused mould lining if desired and may be closed by any suitable means such as a plug.

The operation is as follows:

The mould is mounted for rotation upon runner rims 11—11. Suitable mounting and rotating apparatus is shown in my prior Patent No. 1,457,185 and my copending application Ser. No. 24,627 which has become Patent 1,572,455. An end forming member has pins 4 inserted in the holes 5 of the sufficient length to project against the mould wall. The end forming member 2 being of smaller diameter than the mould thus permits its ready introduction into and removal from the mould. The end forming member 2 is moved to a position as indicated by the dotted lines in Fig. 5, whereupon, reinforcing 6 is projected into the annular groove 6ª of the end forming member 2. Other and additional end forming members and sections of reinforcements may be successively introduced into the mould to form the desired number of body sections. Fig. 1 shows the assembly of parts for forming two body sections at one operation; Fig. 5 for forming four body sections and Fig. 4 for forming only one body section.

In all instances the end forming member first introduced into the mold is moved forward until it seats or rests against flange 8 of band 7, whereupon the last end forming member is introduced against the reinforcing 6 which latter projects into annular groove 6ª. The annular ring 9 is placed against end forming member 2 and secured in position by turning up studs 10 in their threaded seats in band 7ª.

The fusible lining 3 having preferably been applied to the molding surfaces of the end forming members 2 before the latter are inserted into the mould, the latter is now completely lined therewith. A suitable method for lining the mould is to pour in a melted state sufficient quantity of this material to coat mould surfaces, and to then rotate the mould and allow the fusible material to harden. This fusible lining may be of any thickness desired and preferably is sufficient to fill the annular space between the end forming members and the mould wall, thus producing an even surface against which the body is to be cast. The end forming members project inwardly as desired to divide the body into sections and preferably project away from the wall of the mould a distance equal to the thickness of the finished product.

More than one section of reinforcing 6 may be provided if desired by the simple expedient of forming additional annular grooves 6ª in end forming members 2 and providing sections of reinforcing to correspond therewith, one of which slips over the next smaller. Likewise the reinforcing may be positioned as desired away from the mould wall, i. e., by anchoring the reinforcing in annular grooves positioned as desired, in the faces of end forming members 2.

The mould is next rotated and the plastic material for forming the articles to be cast in introduced and spread within the mould about the reinforcing and end forming members and against the fusible material by any suitable means or method, such means or method being no part of my present invention. The mould is continued in rotation to densify the articles cast.

The mould is then removed from the rotating mechanism and conveyed to a convenient point for further operations.

The mould and contents may be placed in an ordinary steam kiln used for curing concrete products, and the usual curing treatment applied, in which event the fusible material will be melted and drained away. As the temperature rises the mould lining will melt away first at the points at which the heat carrying medium, such as steam comes in contact therewith. As this material is melted away from the mould walls, and from the forming surfaces of the end forming members, a free space is provided for the circulation of the curing media about the outer surfaces and the ends of the bodies cast. The bodies will be suspended within the mould, the ends of the reinforcements 6 projecting into annular grooves 6ª in members 2. The ware being cast and densified about the reinforcements is thus supported centrally within the mold, with a free annular space about its periphery and between the ware and the mould. The fusible material having been melted away from the forming surfaces of the end forming members 2 therefore free space about the ends of the body as well. The fusible material may be drained away from the mould either through the crevices between the mould wall and ring 9 or through threaded opening 13 which may be closed with a pipe plug or cock. A valve being preferable if curing is to be effected under pressure and a part of the fused material retained within the mould as a curing and impregnating medium.

In Fig. 5 is shown an assembly of parts for casting four sections of ware at one operation, and it is obvious that any number may be so cast. In this figure a part of the end forming members 2 are of a contour to produce pipe sections having tongue and groove ends. A detailed enlargement of a part of one of these end forming members is shown in Fig. 6. The production of ware having any convenient shaped ends, and any desired number of sections in one operation is contemplated, the forms and number shown merely being illustrative.

In Fig. 4 is shown an arrangement of parts for casting only one body or section at each operation. The reinforcing 6 projects into the annular grooves 6ª in end forming members 2 at each end of the mould. Thus when the body is cast about the reinforcement and fusible mold lining 3 is melted away the body is suspended within the mold by the reinforcement which in turn in supported by the end forming members.

It will be obvious to those skilled in the art that in any of the forms shown the body after being cast is supported away from the mould wall when the mould lining is fused away from the mould and the end forming members, and that the weight of the entire assembly, including the body is carried by pins 4 mounted on the periphery of end forming members 2 and projecting against the mould wall.

Such arrangement provides a free space about the entire surfaces of the bodies cast, which arrangement serves to permit the free circulation of the curing media about the body and permits of the ready longitudinal removal of the bodies out of the mould, which latter may be accomplished upon release of studs 10 and removal of ring 9. In curing and on removal there will be only the pins 4 projecting against the mould and since these may be made of such material as to readily yield or collapse on movement of the body, there will be no pinching or binding of the body and parts on removal from the mould. The pins 4 may be of lead, plaster of Paris or other such material as will not scar the mould surface when the assembly of parts is introduced into and withdrawn from the mould. The provision of the free space about all surfaces of the cast ware by using the fusible material and supporting the ware within and away from the mould, is of vital importance when the body is to be impregnated by the fusible material while undergoing curing. In such curing practice, bulkheads may or may not be provided and secured to the ends of the moulds, as by studs 10 and 10ª, depending on the pressure of the curing media to be used. A fusible material is employed possessing properties which are resistant to, or tend to make the ware resistant to alkalis, acids, or other injurious elements, depending on the service to which the product is to be subjected.

The proper temperatures, presures and duration thereof are attained in accordance with the water content of the mass and density of the ware formed, to cause the fused material, (which breaks up and partially vaporizes at the desired temperatures and pressures) to penetrate the body to the depth desired. The practice of this impregnation is fully set forth in my co-pending application Serial Number 71,009, to which reference is hereby made. The arrangement of parts shown herein is such as to facilitate the practice of impregnation as therein set forth, in addition to the novel results of casting bodies in sections and supporting the cast ware away from the mould to facilitate its proper curing.

This application is filed in substitution, and in continuation in part, of my copending application Serial Number 62,802.

What is claimed is:—

1. The method of casting hollow ware in sections which consists in spacing dividing media longitudinally of a conforming surface, coating such surface and media with a fusible material, rotating a quantity of plastic material against the coating to form a series of sections in one casting operation, then in fusing the coating and flowing a curing agent through the space formerly occupied by the coating, and finally in removing the cast sections and the dividing media by longitudinal movement thereof as a unit out of the conforming surface.

2. The method of casting hollow ware in sections which consists in spacing dividing media longitudinally of a conforming surface, coating such surface with a fusible material, rotating a quantity of plastic material against the coating and about the dividing media to form a series of sections in one casting operation, then in fusing the coating and finally removing the cast sections and dividing media by longitudinal movement thereof out of the conforming surface.

3. The method of casting a multiple number of sections of hollow ware in a single casting operation which consists in spacing dividing and end forming media longitudinally of a conforming surface by means adapted to remain in the cast ware as reinforcements, spacing the latter means away from the conforming surface, coating the conforming surface with a fusible material, then in rotating a quantity of plastic material against the coating to cast the ware about the reinforcements, fusing the coating and supporting the ware away from the conforming surface by the reinforcements, circulating a curing agent about the sections in the space formerly occupied by the lining and then in removing the sections of ware and dividing media longitudinally of the conforming surface.

4. Means for casting hollow ware in a series of sections in one operation consisting of a rotary mould, end forming and dividing media for the ware spaced longitudinally of the mold by and supporting reinforcing means which latter is adapted to remain in the sections of the ware as reinforcements, and means mounted upon the periphery of the end forming and dividing media and engaging the mold to space and support the latter away from the mold.

5. Means for casting hollow ware in a series of sections in one operation consisting of a rotary mould, end forming and dividing media for the ware spaced longitudinally of the mould by and supporting reinforcing means which latter is adapted to remain in the sections of the ware as reinforcements, and means mounted upon the periphery of the end forming and dividing media and engaging the mould to space and support the latter away from the mould and adapted to be moved longitudinally into and out of the latter with the end forming and dividing media.

6. In combination with a mould for forming bodies of cementitious material, end forming members spaced axially of the mould to form a series of sectional bodies of the material, and supporting means for the members engaged therewith and with the moulding surface of the mould to space the peripheries of the members therefrom whereby to allow of removal of the members from the mould.

7. In combination with a mould for forming bodies of cementitious material, end forming members spaced axially of the mould to form a series of sectional bodies of the material, and yieldable supporting means for the members engaged with the moulding surface of the mould to space the peripheries of the members therefrom whereby to allow of removal of the members from the mould.

8. In combination with a mould for forming bodies of cementitious material, end forming members spaced axially of the mould to form a series of sectional bodies of the material, and supporting means for the members engaged therewith and with the moulding surface of the mould to space the peripheries of the members therefrom whereby to allow of removal of the members from the mold, said means being formed of material softer than that of the moulding surface.

In testimony whereof I affix my signature.

CLIFFORD RALPH NICHOLS.